United States Patent
Shen et al.

(10) Patent No.: US 8,711,922 B2
(45) Date of Patent: Apr. 29, 2014

(54) PARTIAL RESPONSE DECISION FEEDBACK EQUALIZER WITH DISTRIBUTED CONTROL

(75) Inventors: Jie Shen, Fremont, CA (US); Ting Wu, Fremont, CA (US); Kun-Yang (Ken) Chang, Los Altos, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 13/641,656

(22) PCT Filed: Apr. 7, 2011

(86) PCT No.: PCT/US2011/031522
§ 371 (c)(1),
(2), (4) Date: Oct. 16, 2012

(87) PCT Pub. No.: WO2011/133333
PCT Pub. Date: Oct. 27, 2011

(65) Prior Publication Data
US 2013/0028313 A1  Jan. 31, 2013

Related U.S. Application Data

(60) Provisional application No. 61/327,580, filed on Apr. 23, 2010.

(51) Int. Cl.
*H04L 27/01* (2006.01)
(52) U.S. Cl.
USPC ........... 375/233; 375/229; 375/230; 375/316; 375/346; 375/348
(58) Field of Classification Search
USPC .......... 375/229, 230, 232, 233, 316, 346, 348
See application file for complete search history.

(56) References Cited

U.S. PATENT DOCUMENTS

| | | | |
|---|---|---|---|
| 8,345,738 B2* | 1/2013 | Abbasfar | 375/229 |
| 2005/0111585 A1* | 5/2005 | Stojanovic et al. | 375/316 |
| 2005/0201491 A1* | 9/2005 | Wei | 375/326 |
| 2005/0254569 A1 | 11/2005 | Momtaz | 375/233 |
| 2007/0195875 A1 | 8/2007 | Agazzi et al. | 375/233 |
| 2007/0242741 A1 | 10/2007 | Carballo et al. | 375/233 |
| 2011/0249774 A1* | 10/2011 | Thakkar et al. | 375/316 |

OTHER PUBLICATIONS

Notification Concerning Transmittal of International Preliminary Report on Patentability (Chapter I) with mail date of Nov. 1, 2012 for Application No. PCT/US2011/031522, includes Written Opinion. 5 pages.

(Continued)

*Primary Examiner* — Siu Lee
(74) *Attorney, Agent, or Firm* — Mahamedi Paradice Kreisman LLP

(57) ABSTRACT

A multi-phase partial response equalizer is disclosed. The equalizer includes receiver circuitry to receive a data symbol over N bit intervals and to generate N sets of samples in response to N clock signals having different phases. A first storage stage is provided, including storage elements to store the sets of samples during a common clock interval. First and second selection circuits are respectively coupled to an input and an output of the first storage stage. An output storage stage is coupled to the second selection circuit to store an output sample. The first and second selection circuits, over multiple clock intervals, cooperatively select the output sample from one of the sets of samples based on a most recent previous output sample.

27 Claims, 8 Drawing Sheets

(56) References Cited

OTHER PUBLICATIONS

PCT Response dated Apr. 18, 2011 to the Invitation to Correct Defects dated Apr. 15, 2011 re Int'l. Application No. PCT/US2011/031522. 9 pages.

PCT Search report and the Written Opinion dated Nov. 30, 2011 re Int'l. Application No. PCT/US2011/031522. 12 Pages.

Varzaghani et al., "A 6-GSamples/s Multi-Level Decision Feedback Equalizer Embedded in a 4-Bit Time-Interleaved Pipeline A/D Converter," IEEE Journal of Solid-State Circuits, vol. 41, No. 4, Apr. 2006. 10 pages.

* cited by examiner

PARTIAL RESPONSE DECISION FEEDBACK EQUALIZER WITH DISTRIBUTED CONTROL

CROSS-REFERENCE TO RELATED APPLICATIONS/TECHNICAL FIELD

Pursuant to 35 U.S.C. §365, this application claims priority from International Application No. PCT/US2011/031522, published as WO 2011/133333 A2 on Oct. 27, 2011, which claims priority from U.S. Provisional Application No. 61/327,580, filed Apr. 23, 2010 and entitled "PARTIAL RESPONSE DECISION FEEDBACK EQUALIZER WITH DISTRIBUTED CONTROL". International Application No. PCT/US2011/031522 and U.S. Provisional Application No. 61/327,580 are hereby incorporated by reference in their entirety.

The disclosure herein relates to communication systems and methods and more particularly to high speed electronic signaling between integrated circuit devices.

TECHNICAL FIELD

Background

Decision feedback equalization (DFE) is an important technique in addressing high-frequency attenuation caused by inter-symbol interference (ISI). Generally, at a receiver end of a chip-to-chip interface, the technique involves sampling input data, and compensating for expected ISI by adjusting the sampled input data levels based on previously received data values. Partial response methods (i.e., PrDFE) further improve basic DFE techniques by processing parallel decision paths for alternative selection for each sampled input symbol. The parallel paths provide a straightforward way to resolve data decisions using the most recent (least latent) data bits.

As signaling rates increase, feeding back the least latent data in time for use in the processing becomes problematic because of timing delays associated with the feedback path. Elaborating on these delays, the circuitry used to establish this feedback only operates so fast, and as signaling rates increase to the point where a bit timing interval becomes too fast for the circuitry to react, it becomes difficult to effectively utilize feedback representing the least latent prior data. Thus, industry has sought ways for reducing the critical timing paths associated with PrDFE, which would enable these equalizers to work with faster signaling rates.

BRIEF DESCRIPTION OF THE DRAWINGS

Embodiments of the disclosure are illustrated by way of example, and not by way of limitation, in the figures of the accompanying drawings and in which like reference numerals refer to similar elements.

DETAILED DESCRIPTION

Figure 1:
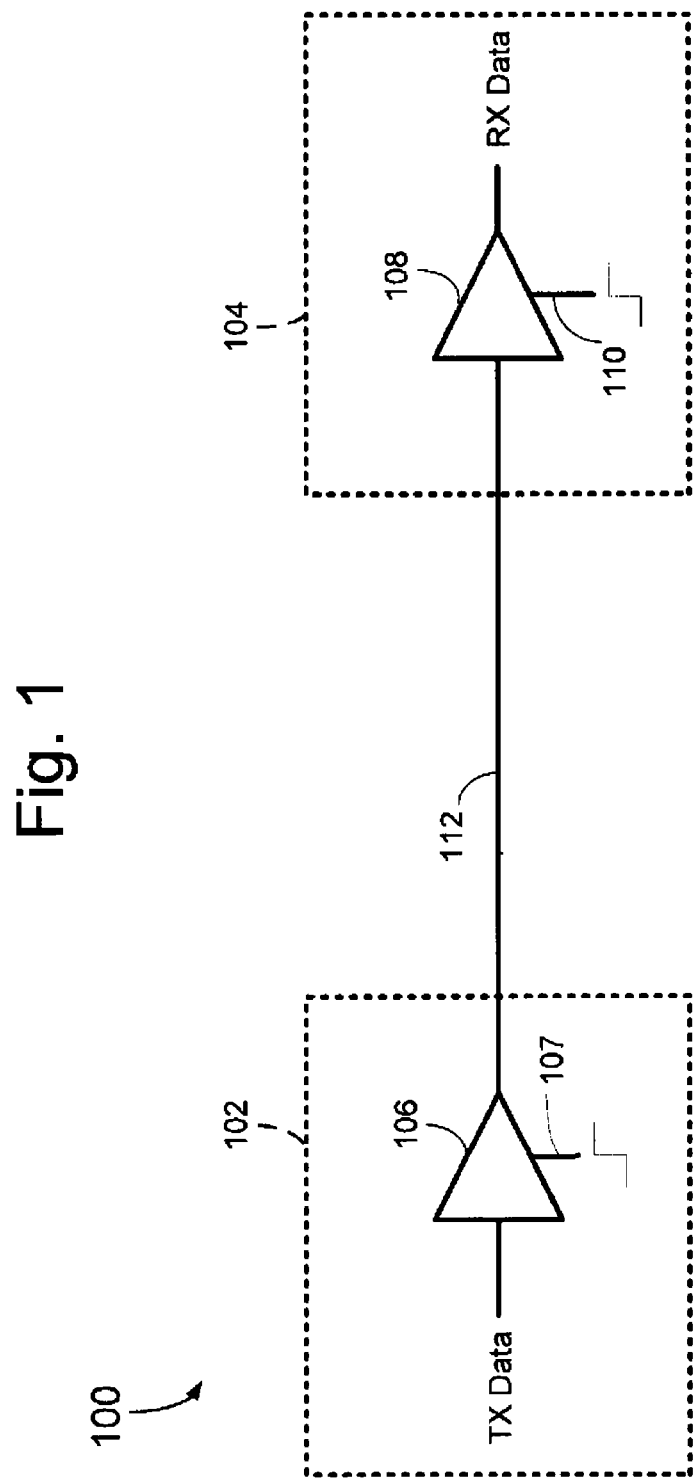
FIG. 1 illustrates a system that includes a transmitter on a first integrated circuit that transmits signals through a signal path to a receiver on a second integrated circuit.

Embodiments of a multi-phase partial response equalizer and related methods are disclosed. One equalizer includes receiver circuitry and selection logic. The receiver circuitry receives a data symbol and generates N sets of conditional samples in response to N clock signals having different phases. Plural storage stages are provided to establish a pipeline architecture, and include an output storage stage to store an output sample. To select the output sample based on at least a most recent previous output sample which preceded the data symbol, the selection logic includes first and second selection circuits distributed across the plural storage stages to cooperatively select the output sample from one of the sets of samples. By distributing aspects of the output sample selection across multiple storage stages, timing delays involved in the decision process to select the output sample may be minimized, and feedback signals that effectuate partial response selection of all sets of the data symbol can occur within a single time window equal of N/2 bit intervals.

To provide a specific example of the foregoing, one contemplated embodiment is a double data rate (DDR) partial response equalizer where a data symbol is sampled using two reciprocal clock signals, each spaced 180 degrees apart in phase. For each phase of the data symbol, two conditional samples can be generated, each using a different sampling threshold, with the proper choice being later selected, at a point further along in the processing pipeline. Contrary to conventional wisdom, this selection of samples can be based on two different selection circuits that are temporally distributed with at least one clocked storage element in between. Ultimate output sample selection can be based on an output sample selection which immediately preceded the data symbol (e.g., the bit which immediately preceded both the "even" and "odd" samples under consideration). In this regard, a first one of the selection circuits can assume that a first conditional sample from one of the DDR phases would produce a true sample if the previous output sample selection had a first logic state, and that a second conditional sample associated with that DDR phase would produce a true sample if the previous output sample selection had a second logic state. This previous output sample selection may be for example, the sample which immediately preceded all phases of the data symbol under consideration. These assumptions may be used to provide conditional selections (of samples for the second DDR phase, i.e., one conditional selection based on each assumption), with these selections being stored. A second one of the selection circuits may then be used to simultaneously select an output sample for the first DDR phase (e.g., a selection between the corresponding conditional samples) as well as an output sample for the second DDR phase (i.e., by selecting between the two conditional selections). The second one of the selection circuits can use a single feedback signal to select outputs samples for both phases (e.g., both dependent on the same prior bit). In this case, for example, the feedback used to select data outputs corresponding to all phases of the data symbol would be selected within a single bit interval (the feedback signals for all phases would fit within N/2 bit intervals=1 bit interval in this DDR example). Such a partial response DDR equalizer provides the timing benefits associated with directly cross-coupled multiplexers (i.e., without any storage or latching within the critical feedback path), but without any data rate instability regions in the multiplexer output or any needed calibration processes to avoid data rate instability regions.

The embodiments presented herein are not limited to DDR implementations of course, and detail will be presented below for other specific embodiments including quad data rate (QDR) and multiple level pulse amplitude modulation (multi-PAM). Other implementations are also possible.

Some of the embodiments presented below relate to methods of equalizing. One method comprises receiving a data symbol and generating first and second sets of samples in response to first and second clock signals having different phases, the sets of samples corresponding to respective bit intervals. A conditional selection of one of the sets of samples is then made, and both this conditional selection and a second of the sets of samples are then stored or aligned to common timing. The method further includes selecting an output sample from the stored selections with a second selection circuit, the selecting based on at least a most recent previous output sample. An output sample which preceded the data symbol can be used to simultaneously select at least two different output samples for the data symbol by selecting one of the conditional selections to produce an output for one of the phases of the data symbol and by selecting between the samples in the second set to produce an output for another of the phases of the data symbol.

Referring now to FIG. 1, one embodiment of a signaling system channel, generally designated 100, employs a chip-to-chip architecture enabling high-speed wired communications between a first integrated circuit (IC) device 102 and a second IC device 104. The first IC device employs transmitter circuitry 106 responsive to a first timing signal input 107 to drive data symbols onto a signal link 112. To receive the data symbols, the second IC device includes receiver circuitry 108 responsive to a second timing signal input 110 to sample the input data symbols. To optimize the signaling rate of the system, the second IC device employs one embodiment of a partial response decision feedback equalization (PrDFE) circuit, more fully described below, to compensate for high frequency attenuation due to ISI and other parasitics. The system shown in FIG. 1 is but one link, while in practice, many links may be utilized. Further, while not shown, each IC device, or chip, may include transceiver circuits, thus employing both transmitters and receivers at each pin to effect bidirectional communication with the other IC device along one or more links. The system may be employed in a variety of applications including, for example, high-speed memory systems where the first IC comprises a memory controller and the second IC comprises a volatile or nonvolatile memory device (such as a DRAM or flash memory chip).

Figure 2:
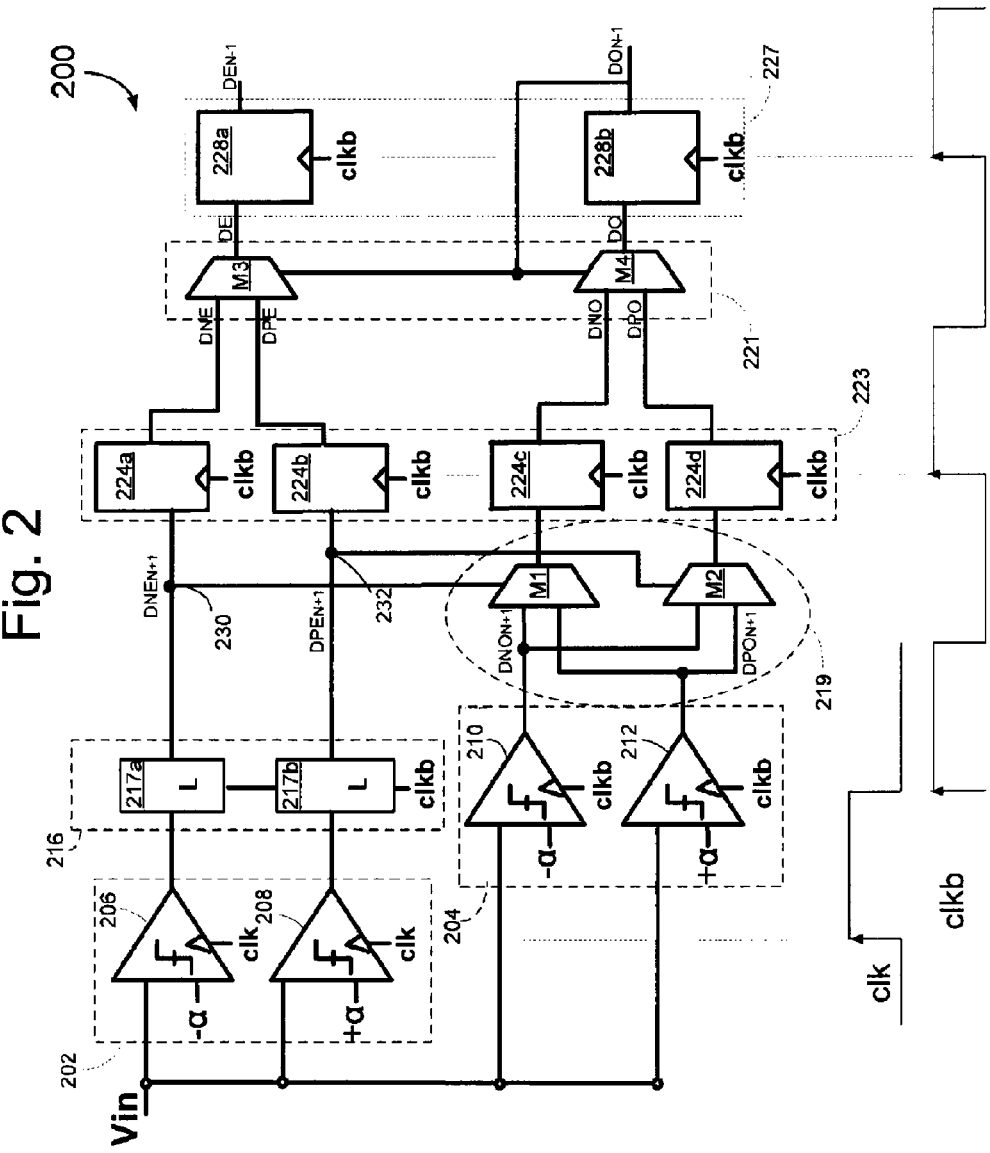
FIG. 2 illustrates one embodiment of a multi-phase partial response decision feedback equalizer (PrDFE) having a single tap for operation at a double-data-rate (DDR).

FIG. 2 illustrates one embodiment of a multi-phase PrDFE in the form of a single-tap double-data-rate (DDR) circuit, generally designated 200. "Multi-phase" refers to transferring multiple bits of data from the input data symbol at a rate higher than the symbol clock rate. Thus, transferring two bits during the symbol clock period (responsive to, for example, respective rising and falling edges of the clock signal) is often termed DDR, while transferring at four-times the clock rate corresponds to quad-data-rate (QDR), and so on. Moreover, "tap" generally refers to the degree of prior data dependency for each output value. For instance, "single-tap" typically refers to adjusting an output value (such as an even data bit represented by DE) based on a single prior data value (such as the most recent odd data bit $DO_{N-1}$), while "multi-tap" often refers to adjusting the output value based on multiple prior data values.

With continued reference to FIG. 2, the PrDFE 200 employs a front-end array of receiver or sampler circuits 202 and 204 (both in phantom) to receive and sample an input data symbol Vin in response to respective primary and secondary clock signals clk and clkb. The secondary clock clkb is generally an inverted copy of the primary clock clk such that the two are offset in phase by 180 degrees. For ease of reference, representations of the clock signals clk and clkb are shown at the bottom of FIG. 2 with edges corresponding to activation of respective stages.

The first receiver circuit 202 includes a pair of comparators 206, 208 having clock inputs for the primary clock clk and respective data inputs to receive the data symbol Vin. Each comparator also includes a "partial-response" threshold input. The partial response threshold value generally corresponds to a negative or positive offset ($-\alpha$, $+\alpha$) with respect to a common mode. The offset represents the amount of partial response compensation to apply to a given output signal based on prior data values, thereby minimizing ISI and other parasitic effects. The comparators 206, 208 generate "negative" and "positive" output sample values, respectively, based upon the comparison between the sampled input data symbol and the partial response values $-\alpha$ and $+\alpha$. The sample set generated in the primary clock domain clk is referred to herein as an "even" set of samples, and is temporarily stored in a pair of unclocked RS latches (not shown) that follow the comparators 206 and 208, respectively and form part of the receiver circuit 202. As will be more evident in the description below, deferring the interpretation of multiple "conditional" output samples enables the circuit to quickly determine the proper sample to use (for the output) based on the least latent prior data sample by providing more time for circuitry to interpret a previously received symbol and feed information about the symbol back so as to correct for ISI based on that symbol.

The second receiver circuit 204 also includes a pair of comparators 210, 212 similar to those of the first receiver circuit 202 (same input signals), but clocked at a different clock phase by the secondary clock clkb. This results in a set of "odd" samples, with negative and positive sample values based respectively on the respective comparisons to the partial response thresholds $-\alpha$ and $+\alpha$. The odd sets of samples are stored by RS latches (not shown) for output by the second receiver circuit 204.

Throughout the disclosure herein, multiple forms of storage elements (such as SR flip flops, D flip-flops, latches, and the like) may be specified for different embodiments. For purposes of clarity, edge-triggered storage elements are shown in the Figures with corresponding clock inputs. Storage elements clocked by a common clock edge, or within the same timing domain, are referred to herein as a storage stage.

With continued reference to FIG. 2, a synchronizing stage 216 is used to synchronize the even and odd sets of conditional samples. The synchronizing stage includes latches 217a-b for each sample in one of the sets, clocked by the secondary clock clkb. The synchronizing stage essentially provides an alignment mechanism so that feedback may be passed from even to odd sample sets (at nodes 230 and 232) without interposing any significant path delay, with everything (i.e., even and odd sets of conditional samples) timed according to a common clock phase. In a DDR embodiment such as depicted in FIG. 2, the time synchronization process thus delays the even sample set by a half clock cycle, or 180 degrees, to align with the opposite phase.

The generated even set of conditional samples comprises a negative sample DNE (resulting from the sampled data comparison to the -a threshold) propagating on a negative even sample path (including comparator 206, storage elements 217a, 224a, and 228a) and a positive sample value DPE. The positive sample propagates on a positive even sample path (involving comparator 208, storage elements 217b, 224b, and 228b) and results from the sampled data comparison to the +a partial response threshold. A similar naming convention and path designation applies to each of the odd samples DNO (data-negative-odd) and DPO (data-positive-odd).

With continued reference to FIG. 2, the PrDFE 200 described herein minimizes control loop feedback delays in resolving even and odd data sample outputs DE and DO by employing distributed feedback loop selection logic in the form of a pre-decode stage 219 and an output selection stage 221. The respective pre-decode and output selection stages are distributed across multiple pipeline stages involving an intermediate storage circuit stage 223 having storage elements 224a-d, followed by an output storage circuit stage 227 including a pair of output storage elements 228a-b. By distributing the feedback loop selection logic in this manner, delays associated with the selection logic may be apportioned over multiple pipeline clock cycles, thus minimizing feedback delay in the final output clock cycle.

Further referring to FIG. 2, the pre-decode stage 219 comprises a pair of multiplexers M1 and M2 disposed in the respective negative and positive sample paths for the odd sample set. Each multiplexer includes a first input to receive the negative sample value and a second input to receive the positive sample value. The control input for the first multiplexer M1 couples to the negative sample path for the even sample set, at 230, to be driven according to the value of the conditional sample $DNE_{N+1}$, while the control input for the second multiplexer M2 taps off the positive sample path for the even sample set, at 232, to driven in response to the value of conditional sample $DPE_{N+1}$. This configuration forms half of a control loop for determining the eventual output data based on prior data. Conditional, or speculative data samples ($DNO_{N+1}$, $DPO_{N+1}$) are selected and passed as conditional selections for input to storage stage elements 224c and 224d based on the negative and positive data samples $DNE_{N+1}$ and $DPE_{N+1}$. As will be explained further below, conditional sample $DNE_{N+1}$ is used to provide a control signal for multiplexer M1 because $DNE_{N+1}$ would necessarily represent the correct logic state of signal $DE_{N+1}$ if the output sample which preceded the data signal was a logic 0, and conditional sample $DPE_{N+1}$ is used to control multiplexer M2 because this sample would necessarily carry the correct logic state of signal $DE_{N+1}$ if the output sample which preceded the data signal was a logic 1; the feedback provided from this preceding output sample will ultimately be applied at the output selection stage 221 (to select outputs for all phase of the data symbol within a window of N/2 bit intervals), but the pre-decode stage 219 performs a conditional selection that allows this to occur.

The output selection stage 221 forms the second half of the control loop with third and fourth multiplexers M3 and M4 having data inputs to each respectively receive (1) the set of conditional samples $DNE_{N+1}$ and $DPE_{N+1}$ from the even phase, and (2) the conditional selections from the pre-decode stage 219, each as stored and provided from the intermediate storage stage 223 upon the rising edge of the secondary clock clkb. The control inputs to the third and fourth multiplexers are both tied to the previous odd data output line $DO_{N-1}$. Thus, the selection of even data output sample value DE is based on the prior odd data value $DO_{N-1}$, while the selection of the odd data output DO is based upon its own prior value $DO_{N-1}$ and that of DE (through the conditional selections of the pre-decode stage based on $DNE_{N+1}$ and $DPE_{N-1}$). Note that by minimizing the circuitry of the output selection stage 221 at the PrDFE output, only one multiplexer delay is involved in the worst-case output feedback path (from the output of flip-flop 228b to the control input of multiplexer M3, and through to the multiplexer output). The resulting circuit thus satisfies the timing constraints represented by the equation:

$$t_{c,q}+t_{mux,so}+t_{su}<N*\text{UI}$$

where $t_{c,q}$ represents the clock-to-Q output delay associated with flip-flop 228b;

$t_{mux,so}$ represents the select-to-output delay of multiplexer M3;

$t_{su}$ represents the set-up delay associated with flip-flop 228a;

UI represents one unit interval (bit period); and

N represents the number of unit intervals in one clock cycle. The timing constraint defined above optimizes the timing margin for resolving the next data value, such as DE, based on the least latent data value, such as $DO_{N-1}$, with all output sample selections being effectuated within a single bit interval (i.e., with all feedback occurring within an interval of 1 UI). Notably, the critical timing path provided by the design of FIG. 2 is such that the feedback path will not constrain signaling rate as long as $t_{mux,sel}<1*\text{UI}$, which is a result comparable to the use of directly cross-coupled multiplexers but without any data instability regions.

Conceptually, the circuit provided by FIG. 2 may be thought of as making a number of conditional assumptions; if a 2-phase-old "odd" data value was a "0," then the value from sampler 206 (based on the $-\alpha$ partial response threshold) would have necessarily produced the correct (true) logic state to control selection of the 1-phase-old "even" data value, for purposes of choosing the correct partial response threshold ($+\alpha$ partial response threshold or $-\alpha$ partial response threshold) from the second receiver circuit 204. Multiplexer (mux) M1 is controlled in this event to choose the proper sampling threshold for the "even" data value, and mux M2 simultaneously outputs a value, but this value will not ultimately be chosen (i.e., it will be discarded based on the function of multiplexer M4, i.e., because it has been assumed that the 1-cycle old "odd" phase value was a "0"). Since it is assumed that the last output sample prior to the data sample was a "0," is it indeed the output of multiplexer M1 that will be ultimately selected by multiplexer M4. On the other hand, if the 2-phase-old "odd" data value was a "1," then the value from sampler 208 (based on the $+\alpha$ partial response threshold) would have necessarily produced the correct (true) logic state to select the 1-phase-old "even" data value and, thus, the value from sampler 208 is used to control multiplexer M2 to choose the proper sampling threshold for the second receive circuit 204. Multiplexer M1 also produces a value under this assumption, but this time, the value of multiplexer M1 will not ultimately be chosen (i.e., it will be discarded based on the function of multiplexer M4). Since it is assumed in this second case that the last output sample prior to the data sample was a "1,", it is indeed the output of multiplexer M2 that will be ultimately selected by multiplexer M4. Note that at the pre-decode stage, the 2-phase-old value has not yet in fact been directly applied in terms of signal, i.e., a conditional selection is made at the pre-decode stage using multiplexers M1 and M2, with the outputs of one of these multiplexer ultimately being used and one of these multiplexers being discarded at multiplexer M4.

While the PrDFE circuit embodiment of FIG. 2 lends itself well to DDR applications, its scalable architecture conveniently provides the foundation for an N-phase PrDFE having one or more taps. As will be described in relation to further embodiments below, this may be accomplished by adding additional copies of selected stages and paths and employing additional clocks.

Figure 3:
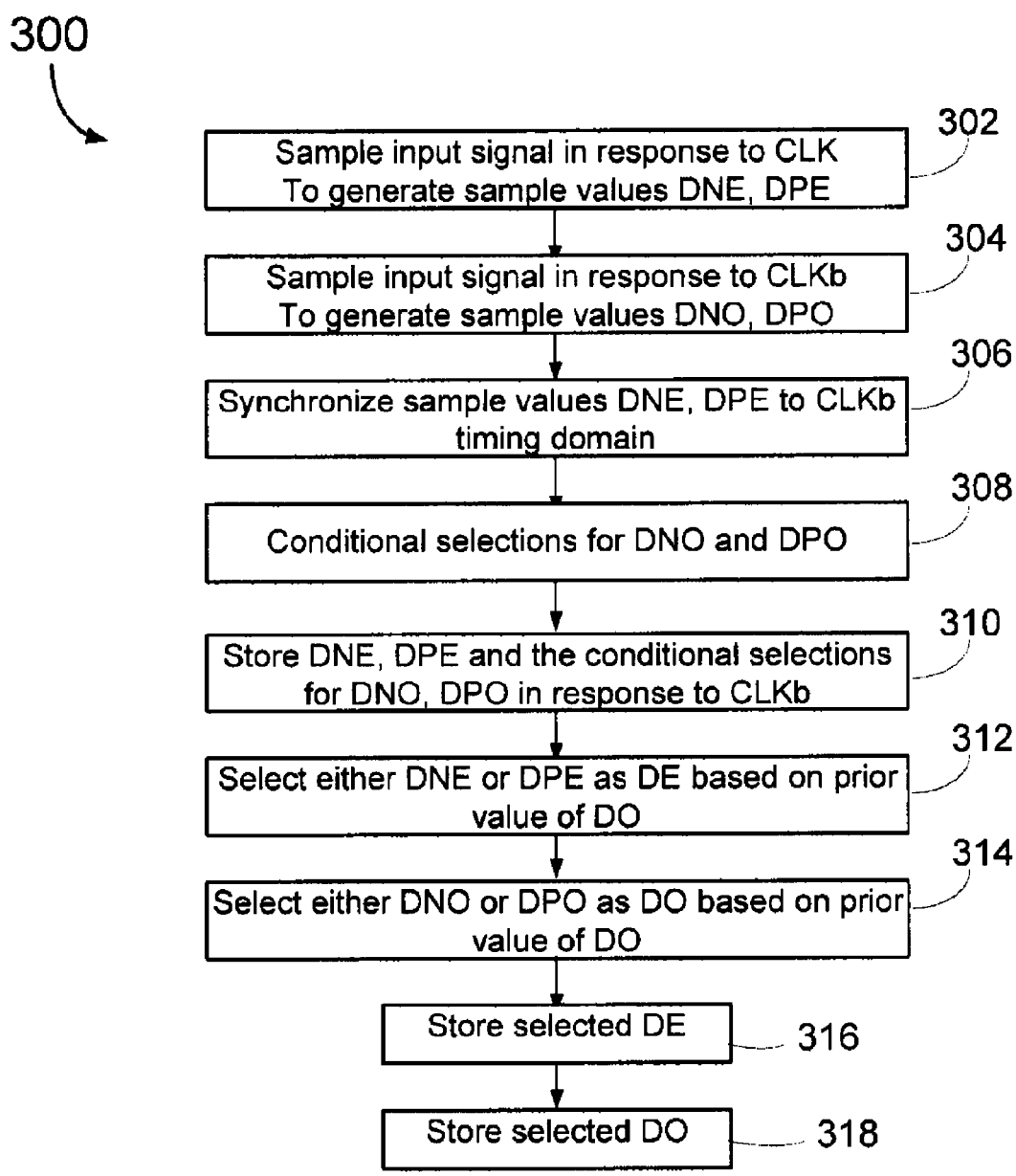
FIG. 3 illustrates a flow chart illustrating one embodiment of a method involving the PrDFE of FIG. 2.

FIG. 3 illustrates a block diagram setting forth a high-level method of operation, generally designated 300, of the PrDFE 200 shown in FIG. 2. The circuit first undergoes an initialization routine to set the various pipeline stages and control loop portions into motion. With initial operation stabilized, the method begins, at 302, by sampling the input data symbol value Vin, with the first receiver circuit 202 in response to the primary clock signal clk. At 304, the second receiver circuit 204 receives and samples Vin a half-cycle later, in response to the secondary clock signal clkb. The even set of conditional samples is then synchronized to the timing domain of the odd set, at 306 by clocking into the synchronizer stage 216. The pre-decode stage 219 of the loop selection logic is then utilized, at 308, by performing conditional selections of the speculative negative and positive odd samples ($DNO_{N+1}$, $DPO_{N+1}$) based on the speculative values of the even samples ($DNE_{N+1}$, $DPE_{N+1}$). The even set of samples and the conditional selections are then stored, at 310, in the intermediate storage circuit stage 223 of storage elements 224a-d in response to the next rising edge of the secondary clock clkb. One cycle later, the even set of samples (DNE, DPE) are fed to the output selection stage 221 of storage elements 224a-d, where the next even output sample DE is selected, at 312, by the third multiplexer M3 based on the previous odd output sample value $DO_{N+1}$. Simultaneously (e.g., within a window of N/2 bit intervals), the fourth multiplexer M4 selects one of the passed odd samples (DNO, DPO or DPO, DNO), at 314, based on the previous odd output sample value $DO_{N-1}$ The method described above provides a sample output selected from competing possibilities based on the least latent previous data value. This provides a resolved data bit far less susceptible to the effects of ISI and other parasitics. Further, by distributing portions of the control loop across multiple pipeline stages, the output stage circuitry may be minimized to provide only a single multiplexer delay for the worst-case feedback path. Distributing the control loop to place the pre-decode stage 219 upstream of the output storage stage 227 also enables the circuit to operate at high data rates without the need for additional calibration circuitry to periodically perform timing adjustments.

Figure 4:
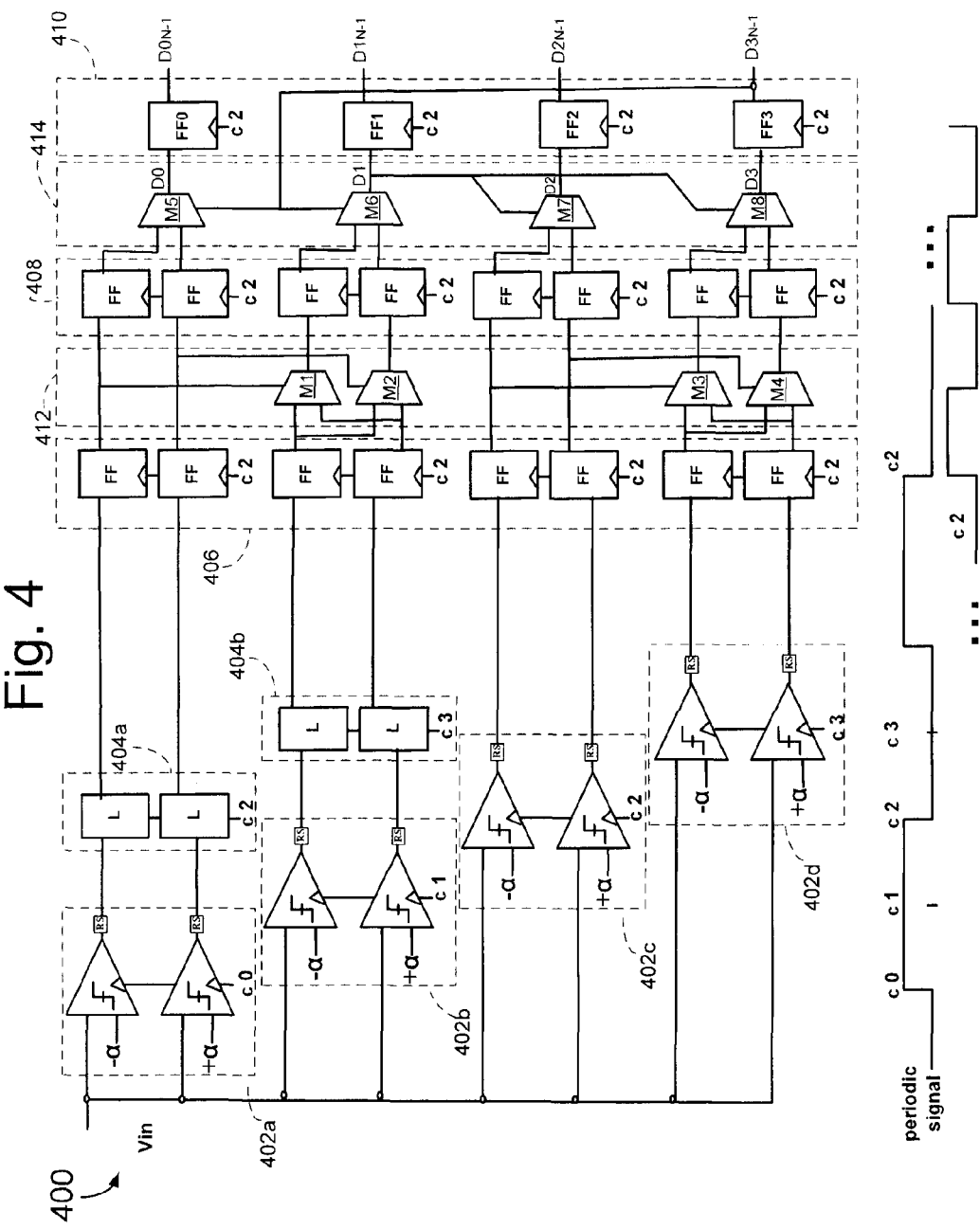
FIG. 4 illustrates one embodiment of a single-tap quad-data rate (QDR) PrDFE.

FIG. 4 provides a further embodiment of a PrDFE circuit 400 with distributed selection logic (also referred to herein as control loop circuitry), in this case for a quad-data-rate (QDR) system. For ease of reference, a periodic system clock is shown with edges corresponding to activation of respective edge-triggered stages (as indicated by clock inputs). Similar to the previously described DDR PrDFE 200, the PrDFE circuit 400 employs multiple receiver circuits 402a-d responsive to the leading edges of respective clocks C0, C1, C2 and C3, where each of the clocks is evenly spaced apart by 90 degrees of phase difference. Clock C2 is shown near the bottom of FIG. 4 as a reference, but for purposes of clarity, the periodic signal seen above is further labeled to indicate where the rising edges of clocks C1 (not actually shown) and C3 (not actually shown) would occur. To reiterate, each of sampling clocks (C0-C3) are of a common frequency (i.e., twice the periodic system clock frequency), but offset from one another in phase. Separate synchronization stages of storage elements (shown as latches 404a and 404b) are employed to buffer and delay the early sampled signals with respect to the later sampled signals in an effort to synchronize the four sets of samples in an input stage of storage elements 406 responsive to one of the clock signals (here, clock C2).

Further referring to FIG. 4, following synchronization and storage of the sets of conditional samples by the input storage stage 406, the backend portion of the PrDFE 400 pipelines the samples through successively clocked intermediate and output storage stages 408 and 410. The final output storage stage 410 employs storage elements FF0-FF3 to store the final selected output sample values D0-D3. The clocked storage stages, although providing multiple clock cycles of latency, enable the distribution of portions of the PrDFE decision control loop out of the time-sensitive output stage, thereby minimizing feedback loop delays in resolving the output sample.

Between the input storage stage 406 and the intermediate and output storage stages 408 and 410 lie respective pre-decode and output selector stages 412 and 414. These selector stages are configured similar to those employed in the DDR PrDFE 200, with the pre-decode stage 414 comprising multiple sets of multiplexers M1-M4 configured such conditional selections from one set of conditional samples (e.g., the second and fourth phases) are based on speculative samples from another set (e.g., the first and third phases). Specifically, in the arrangement of FIG. 4, the negative and positive samples making up the second set of samples (from receiver circuitry 402b) are subject to conditional selection by multiplexers M1, M2 based on the control signals drawn from the contemporaneous values of the negative and positive sample values of the first set (from receiver circuitry 402a). Similarly, the negative and positive samples making up the fourth set of samples are subject to conditional selection (by multiplexers M3, M4) based on the contemporaneous values of the negative and positive sample values of the third sample set.

With continued reference to FIG. 4, the output selector stage 414 comprises multiplexers M5-M8 having data inputs coupled to the clocked storage stage 408 to receive: 1) the first set of conditional sample values originally produced by receiver circuit 402a; 2) the conditional selections representing the second phase of the data symbol, from the pre-decode stage 412 (and multiplexers M1 and M2 in particular); 3) the third set of conditional sample values originally generated by receiver circuit 402(c); and 4) the conditional selections for the fourth data phase, from the pre-decode stage 412 (and multiplexers M3 and M4 in particular). The multiplexers M5 and M6 each have a control input tied to the output node of storage element FF3 to receive the previous sample value for D3, while multiplexers M11 and M12 have control inputs tied to D1 (which represents the value of the second phase of the data symbol. The values for D2 and D3 thus involve two multiplexer delays in the output selector stage (M6 and M7, or M6 and M8) in addition to related flip-flop delays in the final storage stage 410. However, by distributing the selection circuitry across multiple storage stage clock cycles, the multiplexer delay attributable to the pre-decode stage 412 may be absorbed by the first output storage circuit stage 408 and not incurred in the output selector stage 414. As with some of the previous examples, the selection of data outputs for all phases of the data symbol can occur within a window of N/2 (where N=4 in this example), or with all feedback being provided within a window of 2 bit intervals.

Figure 5:
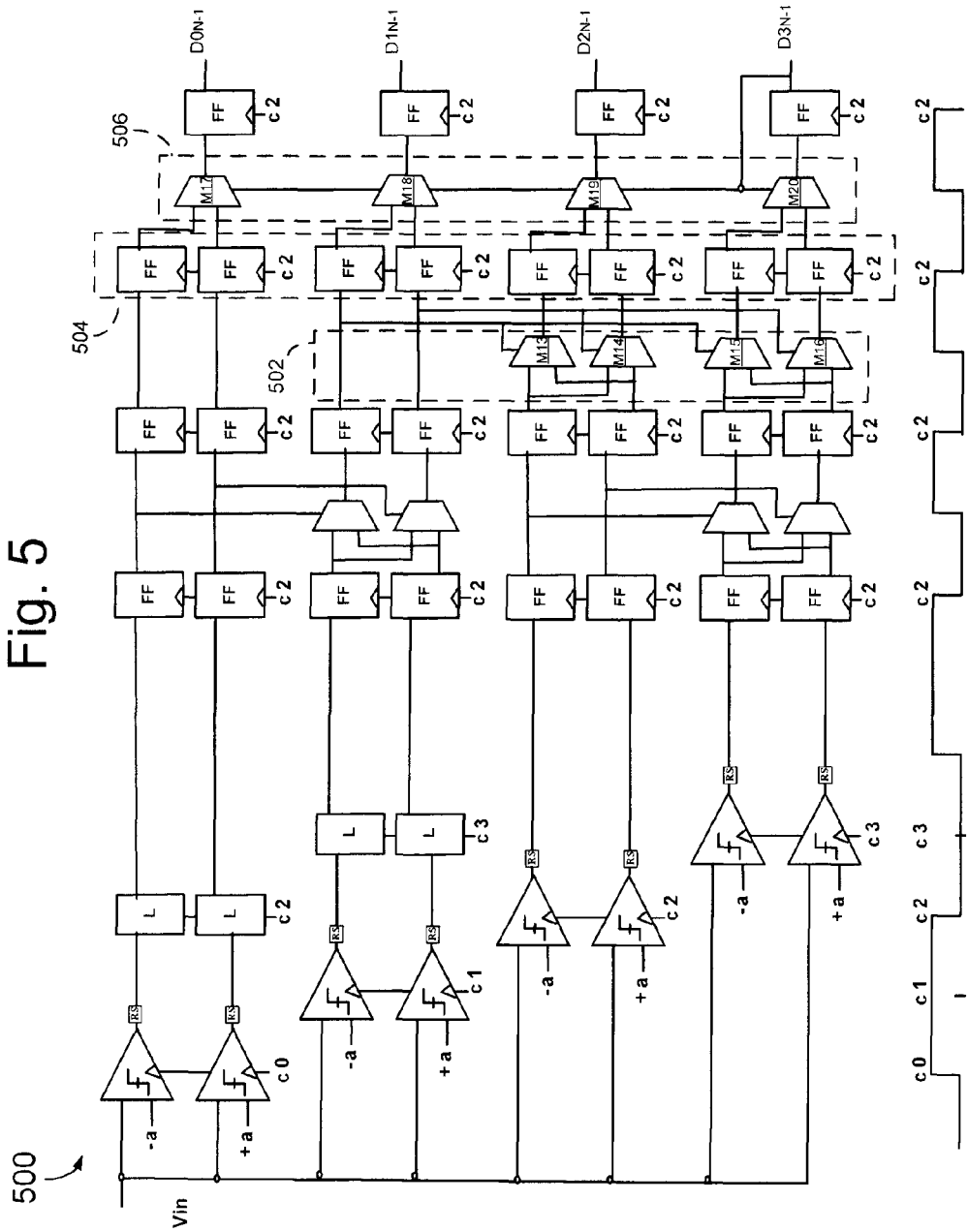
FIG. 5 illustrates a further embodiment of a single-tap QDR PrDFE similar to that shown in FIG. 4.

FIG. 5 illustrates a PrDFE, generally designated 500, architected such that the front-end receiver circuitry, the input storage stage, and the first pre-decode stage circuitry are virtually identical to the circuit of FIG. 4. As a result, for this particular single-tap QDR PrDFE, four sets of conditional samples are generated for processing along respective sample paths. However, in an effort to minimize the selector delay in the output storage stage, a second pre-decode stage 502 and an additional buffering storage stage 504 are employed.

Further referring to FIG. 5, the additional storage circuit stage 504 receives the four sets of conditional samples (all but the first set having been subject to conditional selection based on values from the samples of other sets). Employing respective pairs of multiplexers M13, M14 and M15, M16, the second pre-decode stage is disposed in the third and fourth sample set paths. Having data inputs to receive the negative and positive samples for the third sample set, the first pair of multiplexers M13, M14 include control inputs based on the contemporaneous values of the conditional selections from the second set of samples (i.e., associated with partial response sampling of the second phase of the data symbol). The second pair of multiplexers M15, M16 have data inputs to receive conditional selections from the fourth sample set and have control inputs that likewise tap into the contemporaneous values of the conditional selections from the second set of samples; in the embodiment of FIG. 5, it should thus be noted that the partial response path for the fourth data symbol phase actually has two circuits that perform conditional selection. An output selector stage 506 includes four additional multiplexers M17-M20, one for each set of conditional samples, with control inputs all tied in parallel to the prior value of D3 ($D3_{N-1}$). Consequently, at the output stage, the feedback path for the worst-case decision employs only one multiplexer delay.

Figure 6:
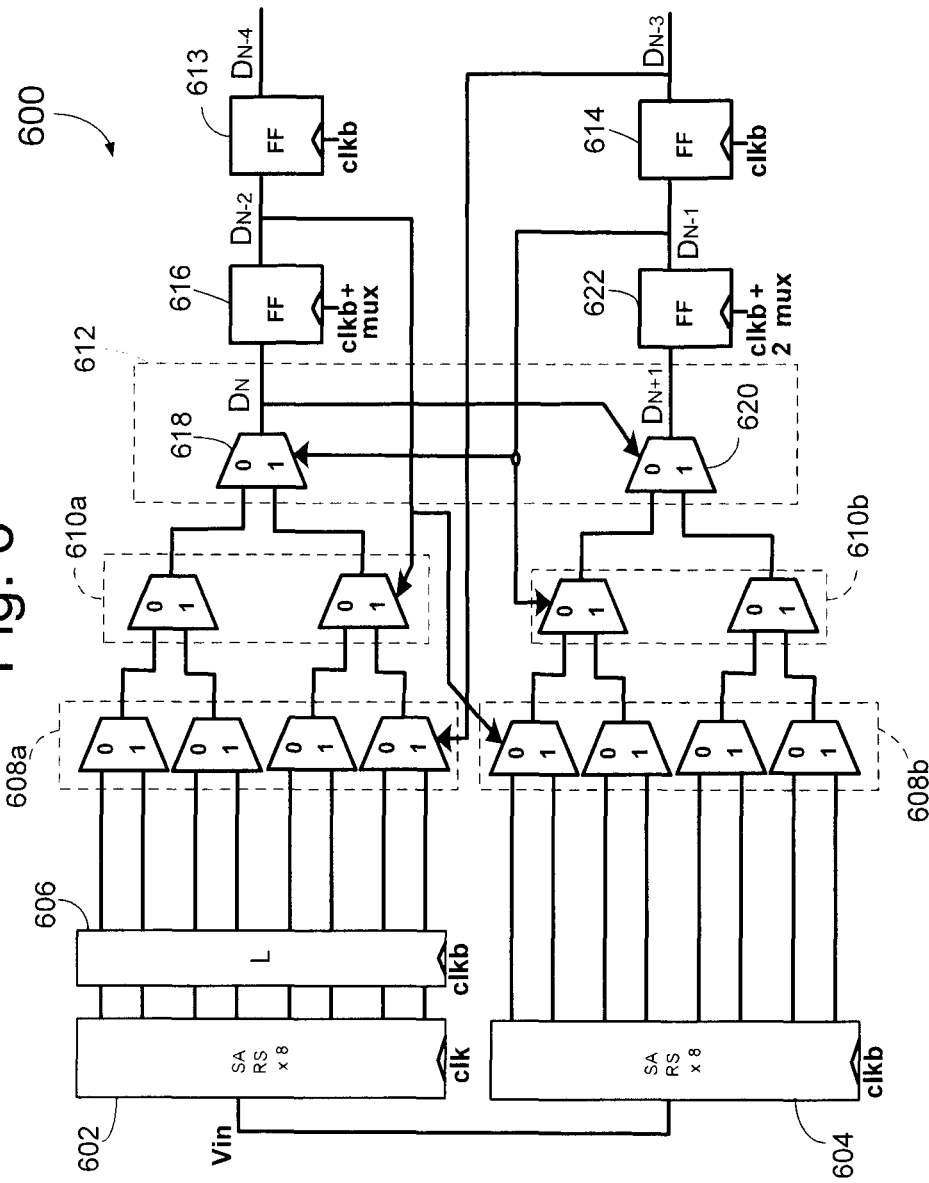
FIG. 6 illustrates an embodiment of a multi-tap DDR PrDFE.

Referring now to FIG. 6, one embodiment of a multi-tap double-data-rate PrDFE, generally designated 600, employs many of the same features described in relation to prior embodiments, albeit with output samples resolved based on feedback from multiple previously-received data values. Generally, for an N-tap configuration, $2^N$ partial response threshold values are typically employed as inputs for respective receiver circuits (similar in configuration to those described in prior embodiments, including comparators and storage elements coupled to the output of each comparator). Thus, to support 3-taps, eight partial response values $\alpha 0$-$\alpha 7$ (not shown) are used as comparator inputs to a first receiver array 602 of eight comparators (or sense amplifiers). The values of the partial response thresholds $\alpha 0$-$\alpha 7$ represent magnitudes of the partial response to the three preceding bits of the input symbol Vin caused by ISI, e.g., to patterns 000, 001, 010, 011, 100, 101, 110, and 111, respectively. Each comparator (not shown) in the first receiver array compares its partial response value to Vin in response to a first clock clk (not shown in FIG. 6). A second receiver array 604 samples in response to a second phase shifted clock clkb (shifted by 180 degrees relative to clk). The two receiver arrays (responsive to the two different clocks) define a double-data-rate configuration with respective even and odd conditional sample paths. A synchronizer 606 re-times the conditional sample set from the first receiver array to the second clock signal clkb such that both sample sets continue processing in a common timing domain.

With continued reference to FIG. 6, a first stage of storage elements in the form of flip-flops 616 and 622 are coupled to the outputs of selectors 618, 620 and provide a timing boundary for separating bit values $D_{N-2}$ and $D_{N-1}$ from $D_N$ and $D_{N+1}$. Flip-flop 616 employs a delayed clock input signal clkb+mux to maintain synchronization between the even and odd conditional sample paths due to the presence of a multiplexer delay from multiplexer 618 (in the control loop path from the output of flip-flop 622 to multiplexer 618). Flip-flop 622 has a similar input clock delay, but since both multiplexers 618 and 620 are involved in the feedback path (from the output of flip-flop 622 to multiplexer 618 to multiplexer 620), the clock delay is a two-multiplexer delay. Suitable delays may be accomplished by, for example, including dummy multiplexers in the clock paths leading to the flip-flops. The delayed clocks provide another form of selection logic distribution.

Further referring to FIG. 6, three tiers of selection logic 608*a*-*b*, 610*a*-*b*, and 612 are employed along the even and odd conditional sample paths to select or pass one output sample from among the eight alternatives from each receiver array. The selection logic lies between the receiver circuitry 602, 604, and the first output storage stage of flip-flops 616 and 622. A second storage stage comprising flip-flops 613 and 614 is also provided for temporarily storing prior data values. The first tier of selectors 608*a* comprises an array of four 2:1 multiplexers each having a control input tied to a Q-output of flip-flop 614 to receive prior sample value $D_{N-3}$. Selector array 608*b* is formed similarly, but with its control inputs tied to a Q-output of flip-flop 616 to receive prior sample value $D_{N-2}$. The second tier of selectors 610*a*-*b* each comprise two 2:1 multiplexers to receive the first tier selected samples as inputs, and provide selected conditional selections based on the values of $D_{N-2}$, and $D_{N-1}$, respectively. The last tier 612 of selectors for each of the even and odd paths provides the single 2:1 multiplexers 618 (even) and 620 (odd) to provide the final sample output based on $D_{N-1}$ and $D_N$, respectively. The last selector tier 612, in combination with flip-flop 622, forms an output control loop with a worst-case feedback delay satisfying the timing constraint:

$$t_{c,q}+2t_{mux}+t_{su}<2 \text{ UI}$$

where $t_{c,q}$ represents the clock-to-Q output delay associated with flip-flop 622;

$2t_{max}$ represents the delays associated with multiplexers 618 and 620; and $t_{su}$ represents the set-up time for flip-flop 622.

The second stage of storage elements 613 and 614 provides a further pipeline bit boundary for data values $D_{N-4}$ and $D_{N-3}$ for separation from values $D_{N-2}$ and $D_{N-1}$. Unlike the prior storage stage, however, because no portion of the control loop extends to the second stage, no delayed clocking scheme need be employed for the flip-flops.

Figure 7:
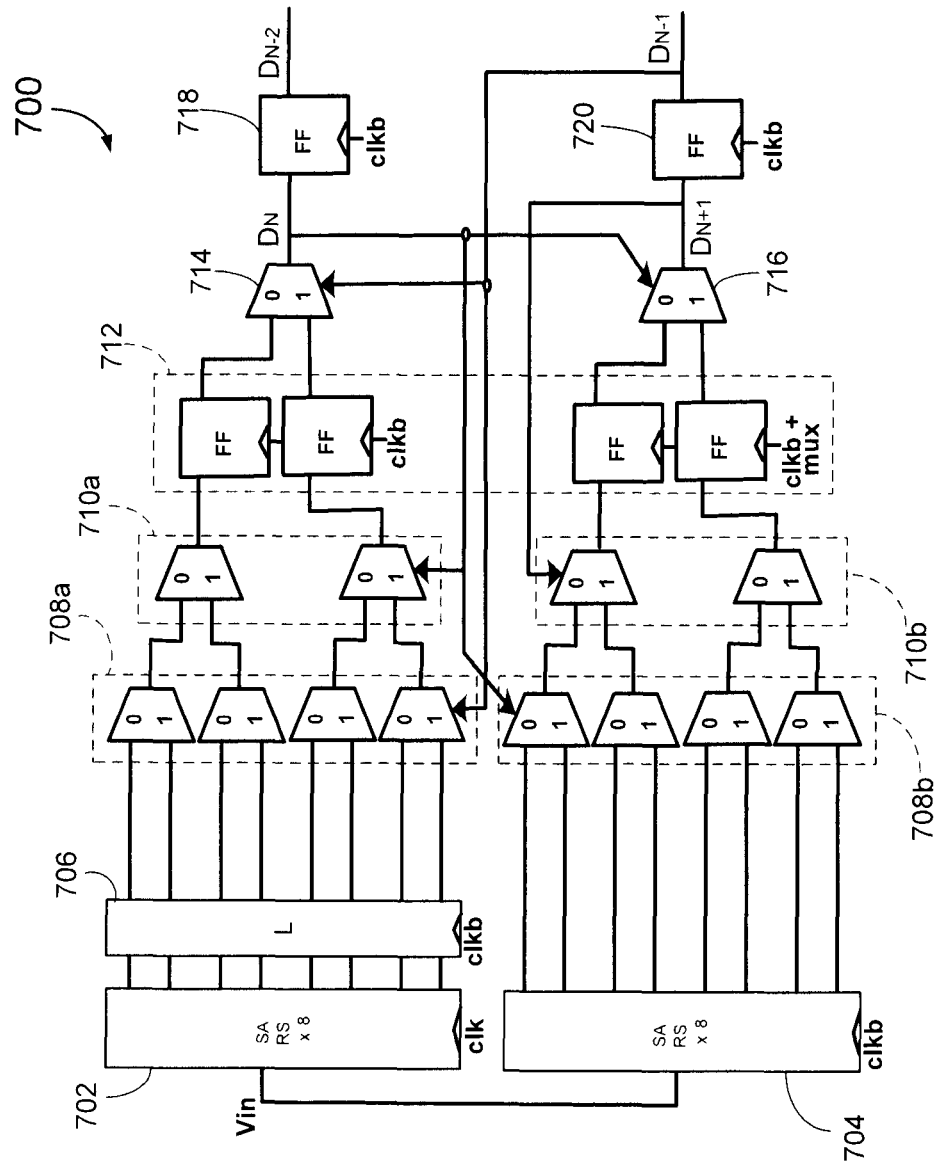
FIG. 7 illustrates a further embodiment of a multi-tap DDR PrDFE similar to that shown in FIG. 6.

Referring now to FIG. 7, a further embodiment of a 3-tap DDR PrDFE is shown, generally designated 700, with a configuration similar to that described in the embodiment of FIG. 6. A pair of receiver arrays 702 and 704 generates respective sets of conditional samples in response to respective clocks clk and clkb and compares the samples to partial response thresholds $\alpha 0$-$\alpha 7$ (not shown). The sample sets are synchronized into the same timing domain by synchronizer 706. A first tier of selection logic 708*a*-*b*, comprising respective sets of multiplexers, receives the conditional sample sets and selects or passes conditional selections based on prior data values $D_{N-1}$ and $D_N$. A second tier of selection logic 710*a*-*b* further reduces the conditional selections based on data values $D_N$ and $D_{N-1}$. To effect a "spatial" selector logic distribution scheme similar to the embodiments described with respect to FIGS. 2-5, a storage element stage 712 having pairs of flip-flops is employed to receive and store the conditional selections from elements 710*a*-*b*. The first pair of flip-flops is clocked by the synchronized clock clkb, while the second pair of flip-flops includes a delayed clock to match the one-multiplexer delay associated with an output control loop (from the Q-output of flip-flop 720 to multiplexer 714 to multiplexer 716). A final stage of storage elements comprising flip-flops 718 and 720 is disposed downstream of the final selector stage to separate data bits $D_N$ and $D_{N+1}$ from data bits $D_{N-2}$ and $D_{N-1}$.

Like the PrDFE 600 of FIG. 6, the embodiment shown in FIG. 7 satisfies the timing constraint: $t_{c,q}+2t_{max}+t_{su}<2$ UI. By shifting the storage stage 712 to a position earlier in the pipeline, it provides easier matching for the clock+mux path versus the datapath.

Figure 8:
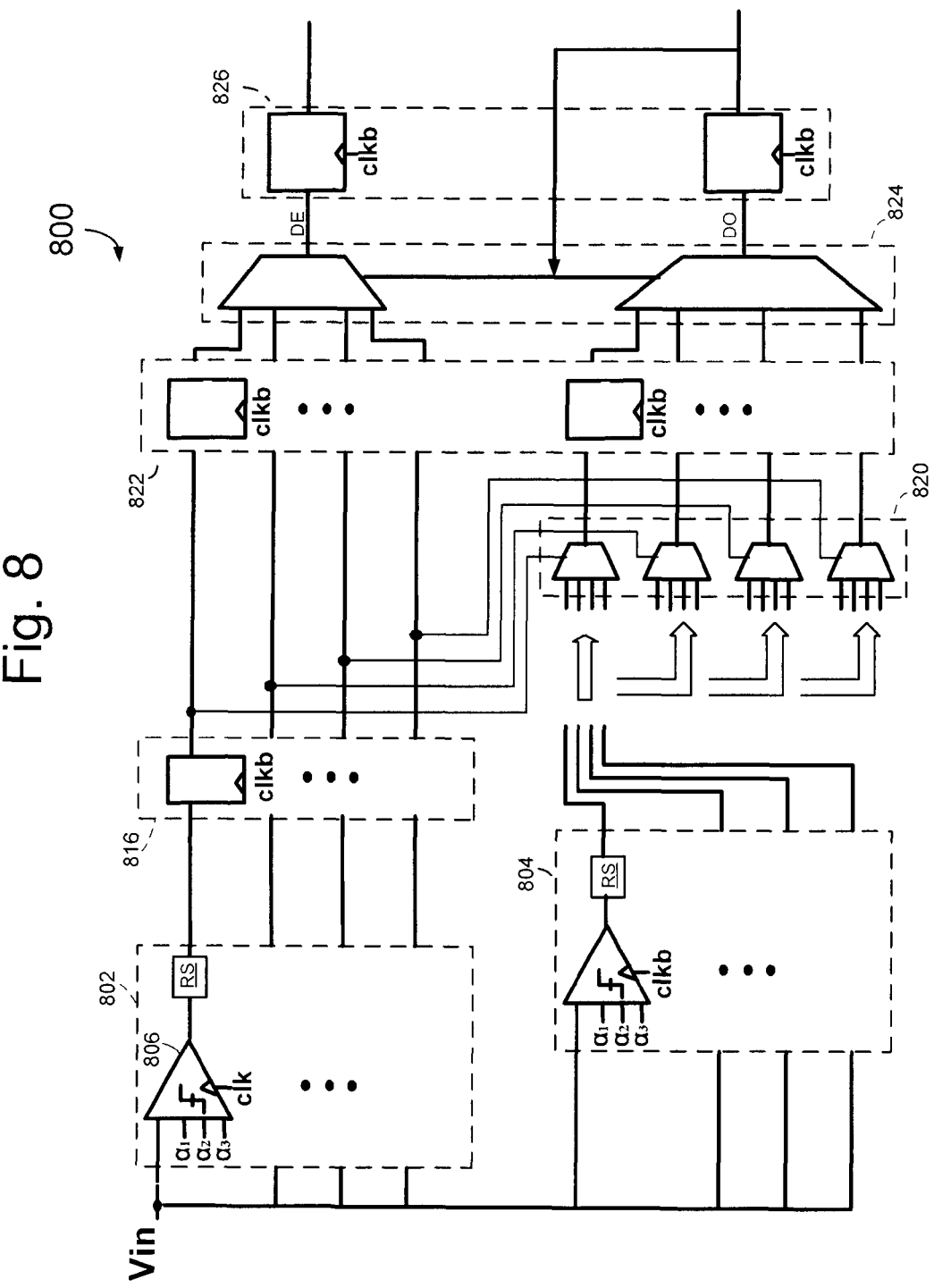
FIG. 8 illustrates an embodiment of a multi-PAM PrDFE.

The previous embodiments described herein generally show two-level signaling schemes that carry signals at one of two signal levels (i.e. at either a logic zero level or a logic one level). Such systems are often referred to as 2-PAM to denote pulse amplitude modulation at the two signal levels. FIG. 8 illustrates an embodiment of a 4-PAM (Pulse Amplitude Modulated) PrDFE, generally designated 800, employing many of the features described in the previous embodiments, but where four levels are employed resulting in multiple data eyes during a given unit interval UI.

Further referring to FIG. 8, the DDR 4-PAM PrDFE 800 includes respective even and odd receiver circuits 802 and 804 responsive to respective clocks CLK and CLKb. The clocks are offset in phase by approximately 180 degrees. Each receiver circuit employs four comparators 806 (only one shown for purposes of clarity) to receive a multilevel signal (here, 4 levels), each comparator having a data input and three threshold inputs. A buffer RS receives a 2-bit output generated by the comparator in response to the associated clock signal. Each 2-bit even sample undergoes a synchronization to the domain of clock CLKb by synchronizer 816. The odd set of conditional samples generated by receiver circuit 804 feeds a first selection circuit 820 comprising four 4:1 multiplexers. Based on the even samples output from the synchronizer 816, each multiplexer makes a conditional selection of a 2-bit data value from among the four available inputs. A first storage stage 822 stores the even samples and the conditional selections for the odd data phase. The samples are then fed from the first storage stage to a second selection circuit 824 comprising two 4:1 multiplexers. The multiplexers each select a 2-bit data value for a corresponding bit interval based on the previous values of the odd data sample. The output samples are then stored in an output storage stage 826.

It should be noted that the various circuits disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.).

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

The invention claimed is:

1. A multi-phase partial response equalizer comprising:
receiver circuitry to receive a data symbol over N bit intervals and to generate N sets of samples in response to N clock signals having different phases;
a first storage stage including storage elements to store the sets of samples during a common clock interval;
first and second selection circuits respectively coupled to an input and an output of the first storage stage; and
an output storage stage coupled to the second selection circuit to store an output sample, wherein the first and second selection circuits, over multiple clock intervals, cooperatively select the output sample from one of the sets of samples based on at least a most recent previous output sample.

2. The equalizer of claim 1 wherein the receiver circuitry generates first and second sets of samples in response to first and second clock signals having different phases, the receiver circuitry comprising:
first and second pairs of comparators to sample the data symbol at a double-data-rate, each comparator having a first input to receive and sample the data symbol and a second input to receive one of a positive or negative partial response threshold value for comparison to the sampled data symbol, each comparator to generate a respective sample based on the comparison.

3. The equalizer of claim 1 and further including:
a synchronizer interposed between the receiver circuitry and the first storage stage to synchronize the first and second sets of samples to a common timing domain.

4. The equalizer of claim 3 wherein the synchronizer comprises:
a pair of latches clocked by one of the N clock signals to retime one of the N sets of samples to have timing aligned with a second of the N sets of samples.

5. The equalizer of claim 1 wherein:
the first selection circuit comprises a pre-decode stage coupled between the receiver circuitry and the first storage stage; and
the second selection circuit comprises an output selection stage coupled between the first storage stage and the output storage stage.

6. The equalizer of claim 5 wherein the pre-decode stage comprises:
a first multiplexer having data inputs to receive the second set of samples from the receiver circuitry, and a control input coupled to receive one of the samples from the first set; and
a second multiplexer having data inputs to receive the second set of samples from the receiver circuitry, and a second control input coupled to receive another of the first set of samples.

7. The equalizer of claim 5 wherein the output storage stage comprises two multiplexers having control inputs coupled in parallel to one of the data outputs, a first of the two multiplexers having inputs coupled to receive the stored first set of samples, a second of the two multiplexers having inputs coupled to receive outputs from the pre-decode stage representing the second set of samples.

8. The equalizer of claim 1 wherein the receiver circuitry comprises:
four pairs of comparators to sample the data symbol at a quad-data-rate to generate four sets of samples in response to respective clock signals having different phases.

9. The equalizer of claim 8 and further including:
a synchronizer interposed between at least one of the four pairs of comparators and the first storage stage, to synchronize at least two of the sets of samples to a common timing domain.

10. The equalizer of claim 9 wherein:
the first selection circuit comprises a pre-decode stage coupled between the receiver circuitry and the first storage stage; and
the second selection circuit comprises an output selection stage coupled between the first storage stage and the output storage stage.

11. The equalizer of claim 10 and further including a second pre-decode stage disposed between the first pre-decode stage and the output selection stage.

12. The equalizer of claim 11 wherein the output selection stage incurs no more than a single multiplexer delay when selecting based on the prior output sample value.

13. The equalizer of claim 1 wherein a feedback path couples the output storage stage to the second selection circuit to define a single-tap configuration.

14. The equalizer of claim 1 wherein the output storage stage is clocked by one of the N clock signals.

15. The equalizer of claim 1 and further including:
plural output storage stages to store plural output sample values, wherein each output sample value is based on the values of plural previous output sample values.

16. The equalizer of claim 15 wherein at least one of the plural output stages is clocked by one of the N clock signals delayed by a delay value associated with a selection logic delay.

17. The equalizer of claim 16 wherein the selection logic delay corresponds to at least one multiplexer delay.

18. The equalizer of claim 15 and further including:
second selection circuitry distributed across the plural output stages.

19. A multi-phase partial response equalizer comprising:
receiver circuitry to receive a data symbol and generate first and second sets of samples in response to respective first and second clock signals having different phases;
a first stage of storage elements to receive the first and second sets of samples in a common timing domain, the first stage to store the first set of samples and a conditional selection from the second set of samples, the conditional selection based on the first set of samples; and
a second stage of storage elements to store a selected first output sample from the conditional selection, the selected first output sample based on the value of a previous output sample from the second stage, and a selected second output sample from the stored first set of samples based on the value of the previous output sample.

20. A method of equalizing comprising:
receiving a data symbol and generating first and second sets of conditional samples in response to first and second clock signals having different phases, the sets of conditional samples corresponding to respective bit intervals;

producing conditional selections from the second set of conditional samples using a first selection circuit;

storing the samples from the first set and the conditional selections from the second set in a first storage stage; and selecting an output sample with a second selection circuit from each of (1) the samples from the first set and (2) the conditional selections dependent upon a previous symbol.

21. The method of equalizing according to claim 20 and further including:

synchronizing the first and second sets of conditional samples to a common timing domain.

22. The method of claim 20 wherein the conditionally selecting samples is controlled according to the value from the first set of conditional samples.

23. A multi-phase partial response receiver to receive an input signal, comprising:

a plurality of samplers, at least two for each phase of the input signal, the samplers for each phase applying respective thresholds to the input signal to produce conditional samples;

alignment circuitry to align the conditional samples to a common clock phase;

a first selection stage including at least two first-stage multiplexers, each first-stage multiplexer to receive each of the conditional samples for a second one of the phases of the input signal at the common clock phase, the first-stage multiplexers receiving as selection control signals respective ones of the conditional samples for a first one of the phases, each first-stage multiplexer selecting between the conditional samples for the second one of the phases and producing an output;

a first delay stage to receive and delay the conditional samples for the first one of the phases, and the first-stage multiplexer outputs; and a second selection stage including a first second-stage multiplexer that selects between the delayed conditional samples for the first one of the phases, and a second second-stage multiplexer that selects between the delayed outputs of the first stage multiplexers.

24. The multi-phase partial response receiver of claim 23, wherein:

the multi-phase partial response receiver further comprises a second delay stage that receives and delays an output of the second second-stage multiplexer to produce a second phase data output; and the first and second second-stage multiplexers each receive the second phase data output as a selection control signal.

25. The multi-phase partial response receiver of claim 24, embodied as a single tap, double data rate receiver, wherein:

the plurality of samplers is exactly four samplers;

the first selection stage includes exactly two multiplexers; and the second storage stage includes an even phase output register and an odd phase output register, the even phase output register receiving and latching a resolved data symbol corresponding to the first one of the phases, the odd phase output register receiving and latching a resolved data symbol corresponding to the second one of the phases, to produce the second phase data output.

26. A multi-phase partial response equalizer comprising:

receiver circuitry to receive a data symbol over first and second bit intervals and to generate a first set of conditional samples in response to the first bit interval, and a second set of conditional samples in response to the second bit interval;

alignment circuitry to align the first and second sets to a substantially common timing phase;

conditional selection circuitry to generate two conditional selections for the second set based on the conditional samples in the first set;

a storage stage to store the two conditional selections and the first set of conditional samples; and sample selection circuitry to generate a first phase data output based on the first set of conditional samples and a second phase data output based on the two conditional selections, each data output being selected according to a prior second phase data output.

27. A multi-phase partial response equalizer comprising:

a sampling stage to generate plural conditional samples for each phase of an input signal;

a first selection stage to generate a conditional selection from amongst at least two conditional samples for one of the phases of the input signal;

a first storage stage to store the conditional selection as well as at least two of the plural conditional samples; and a second selection stage to select a data output for each phase of the input signal, the second selection stage performing selection for each phase of the input signal based upon a common feedback value.

* * * * *